(12) United States Patent
Strijkers et al.

(10) Patent No.: US 10,581,703 B2
(45) Date of Patent: Mar. 3, 2020

(54) METHOD FOR CONTROLLING ON-DEMAND SERVICE PROVISIONING

(71) Applicants: KONINKLIJKE KPN N.V., Rotterdam (NL); NEDERLANDSE ORGANISATIE VOOR TOEGEPAST-NATUURWETEN SCHAPPELIJK ONDERZOEK TNO, 's-Gravenhage (NL); IMEC VZW, Leuven (BE); UNIVERSITEIT GENT, Ghent (BE)

(72) Inventors: Rudolf Strijkers, Zurich (CH); Shuang Zhang, Delft (NL); Jeroen Famaey, Zwijndrecht (BE); Niels Bouten, Sint-Eloois-Vijve (BE)

(73) Assignees: KONINKLIJKE KPN N.V., Rotterdam (NL); NEDERLANDSE ORGANISATIE VOOR TOEGEPAST-NATUURWETEN SCHAPPELIJK ONDERZOEK TNO, 'S-Gravenhage (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 102 days.

(21) Appl. No.: 15/538,188

(22) PCT Filed: Dec. 17, 2015

(86) PCT No.: PCT/EP2015/080209
§ 371 (c)(1),
(2) Date: Jun. 20, 2017

(87) PCT Pub. No.: WO2016/102297
PCT Pub. Date: Jun. 30, 2016

(65) Prior Publication Data
US 2017/0346704 A1      Nov. 30, 2017

(30) Foreign Application Priority Data
Dec. 24, 2014   (EP) .................................... 14200309

(51) Int. Cl.
*G06F 15/16* (2006.01)
*H04L 12/24* (2006.01)
(Continued)

(52) U.S. Cl.
CPC ...... *H04L 41/5054* (2013.01); *G06F 9/45558* (2013.01); *G06F 9/5005* (2013.01);
(Continued)

(58) Field of Classification Search
CPC ............. H04L 41/5054; H04L 41/5051; H04L 41/509; H04L 41/5096; G06F 9/45558; G06F 9/5005; G06F 2009/45595
(Continued)

(56) References Cited

U.S. PATENT DOCUMENTS 8,326,283 B1    12/2012  Hursey
8,477,610 B2 *   7/2013  Zuo ......................... H04L 47/20
                                                        370/230
(Continued)

FOREIGN PATENT DOCUMENTS

EP      2 086 180 A1    8/2009
JP     2005-284753 A   10/2005
(Continued)

OTHER PUBLICATIONS

Kueh, et al., "Application of Context Transfer for Roaming in IP-Based Evolved 3G Networks," *Personal, Indoor and Mobile Radio Communications, IEEE 17th Inter National Syposium*, pp. 1-5, (Sep. 1, 2006).
(Continued)

*Primary Examiner* — Melvin H Pollack
(74) *Attorney, Agent, or Firm* — Hamilton, Brook, Smith & Reynolds, P.C.

(57) ABSTRACT

The disclosure relates to a computer-implemented method for controlling on-demand service provisioning in a net-
(Continued)

work, wherein the network comprises resources for providing a service. In the method, a service request is intercepted. At least one network function, indicated as a first network function, required for the service associated with the service request is determined. Then, the first network function is instantiated on a resource in the network for executing the service in the network.

18 Claims, 9 Drawing Sheets

(51) Int. Cl.
*G06F 9/50* (2006.01)
*G06F 9/455* (2018.01)

(52) U.S. Cl.
CPC .. *G06F 2009/45595* (2013.01); *H04L 41/509* (2013.01); *H04L 41/5051* (2013.01); *H04L 41/5096* (2013.01)

(58) Field of Classification Search
USPC .......................................................... 709/226
See application file for complete search history.

(56) References Cited

U.S. PATENT DOCUMENTS

| | | | |
|---|---|---|---|
| 8,676,159 B1 | 3/2014 | Shu | |
| 9,077,553 B2 | 7/2015 | Paredes | |
| 9,445,279 B2* | 9/2016 | Li | H04W 88/16 |
| 9,569,587 B2* | 2/2017 | Ansari | H04L 63/08 |
| 9,762,679 B2 | 9/2017 | Gast | |
| 9,781,016 B1 | 10/2017 | Marquardt | |
| 9,866,472 B2* | 1/2018 | Biancaniello | H04L 45/306 |
| 10,000,350 B2* | 6/2018 | Hirata | B41J 11/0055 |
| 10,021,738 B1 | 7/2018 | Meha | |
| 10,055,240 B2* | 8/2018 | Chastain | G06F 9/45533 |
| 10,057,109 B2* | 8/2018 | Shatzkamer | G06F 9/455 |
| 10,079,897 B2* | 9/2018 | Cortes Gomez | H04L 67/16 |
| 10,120,714 B1* | 11/2018 | Cabrera | G06F 9/50 |
| 10,205,719 B2* | 2/2019 | Feng | H04L 63/0823 |
| 2001/0049790 A1 | 12/2001 | Faccin | |
| 2005/0220039 A1 | 10/2005 | Hoshino et al. | |
| 2008/0263212 A1 | 10/2008 | Goix | |
| 2011/0145806 A1 | 6/2011 | Cook | |
| 2012/0134323 A1 | 5/2012 | Perkuhn | |
| 2012/0271949 A1 | 10/2012 | Radhakrishnan et al. | |
| 2013/0103624 A1* | 4/2013 | Thieberger | G06Q 10/063 706/12 |
| 2014/0229945 A1 | 8/2014 | Barkai et al. | |
| 2014/0317261 A1 | 10/2014 | Shatzkamer et al. | |
| 2015/0039762 A1 | 2/2015 | Xie | |
| 2016/0094988 A1 | 3/2016 | Lee | |
| 2016/0286378 A1 | 9/2016 | Salmela | |
| 2017/0086231 A1 | 3/2017 | Kim | |
| 2017/0142206 A1 | 5/2017 | Kodaypak | |
| 2017/0250917 A1* | 8/2017 | Ruckstuhl | H04L 45/306 |
| 2017/0288909 A1* | 10/2017 | Bottorff | H04L 12/6418 |
| 2017/0302623 A1* | 10/2017 | Bifulco | H04L 45/64 |
| 2017/0353980 A1 | 12/2017 | Strijkers et al. | |
| 2018/0198717 A1* | 7/2018 | Khasnabish | H04L 43/026 |
| 2018/0270724 A1 | 9/2018 | Horn | |
| 2019/0007502 A1 | 1/2019 | Strijkers et al. | |

FOREIGN PATENT DOCUMENTS

| | | |
|---|---|---|
| JP | 2009-505561 A | 2/2009 |
| JP | 2009-277217 A | 11/2009 |
| JP | 2014-192856 A | 10/2014 |
| JP | 2018/508062 A | 3/2018 |
| WO | WO 2007/021301 A2 | 2/2007 |
| WO | WO 2017/054841 | 4/2017 |
| WO | WO 2017/114757 A1 | 7/2017 |

OTHER PUBLICATIONS

3GPP ETSI TS 123 002 v13.4.0 "Digital Cellular Telecommunications System—Network Architecture," (Mar. 2016).
International Search Report and Written Opinion of International Searching Authority issued in International Application No. PCT/EP2015/080209, entitled "Method for Controlling on-Demand Service Provisioning," Date of Completion of Search: Jan. 28, 2016; dated Feb. 4, 2016.
Extended Search Report issued in European Application No. 14200309.4 entitled "Method for Controlling on-Demand Service Provisioning," Date of Completion: Mar. 30, 2015; dated Apr. 9, 2015.
Tanaka, Katsuya et al., "Design of a Personalized Video Streaming Framework Providing a Flexible Service Structure," The Institute of Electronics, Information and Communication Engineers, Technical Report, vol. 114, No. 335, pp. 7-12 (Nov. 20, 2014).
Tsubouchi, Koji et al., "NFV Management and Orchestration Technology to Automatically Build Network Services on Demand," The Institute of Electronics, Information and Communication Engineers, Technical Report, vol. 114, No. 206, pp. 107-112 (Sep. 4, 2014).
Kojima, Hisashi et al., "Service chaining methods for network function virtualization on carrier networks," The Institute of Electronics, Information and Communication Engineers, Technical Report, vol. 113, No. 205, pp. 13-18 (Sep. 5, 2013).

* cited by examiner

US 10,581,703 B2

METHOD FOR CONTROLLING ON-DEMAND SERVICE PROVISIONING

This application is the U.S. National Stage of International Application No. PCT/EP2015/080209, filed Dec. 17, 2015, which designates the U.S., published in English, and claims priority under 35 U.S.C. §§ 119 or 365(c) to European Application No. 14200309.4, filed Dec. 24, 2014. The entire teachings of the above applications are incorporated herein by reference.

FIELD OF THE INVENTION

The invention relates to a method, network nodes and computer programs for controlling on-demand service provisioning. More specifically, the invention relates to a computer implemented method for controlling on-demand service provisioning in a network comprising resources for providing the service.

BACKGROUND

In traditional networks, the functionality of a network node is coupled with a physical device and, hence, the establishment of a network service involves setting up physical devices, their connection and configuration. If demands change for an existing service or a new service is demanded, the network operator needs to add or remove devices from the network to increase or decrease capacity or functionality.

A particular service may comprise a plurality of functions to be executed. A function is responsible for a specific treatment of packets received by the function. The function can be embedded in a physical network element or be a software instance (e.g. a virtual network function), running on a (virtualized) physical infrastructure.

Network Function Virtualization (NFV) is a method to decouple network functions, e.g. router, firewall, application layer gateway, virus scanner from the physical device using virtualization technologies, such as VMware. Virtualization enables physical devices to be regarded as resources on which network functions can be loaded dynamically. For example, when a network service is required to filter traffic at a certain location in a network, NFV allows allocation of a firewall network function to a physical device (e.g. a cloud datacentre). Every Virtual Network Function (VNF) is hosted on one or more Virtual Machines (VMs). A VM emulates a physical machine, making it possible to host multiple VMs on a single physical machine. Every VM makes use of a share of the physical machine's resources. These physical resources include CPU, memory, bandwidth, and disk space.

A service can be described as a Service Function Chain (SFC). An SFC defines a set of one or more network functions for a service and ordering constraints for the functions through which data packets are exposed. To instantiate a service, the SFC is executed by a NFV Management and Orchestration system, e.g. like defined in ETSI NFV. It includes a NFV Orchestrator that manages the service lifecycle and coordinates the management of the relevant resources to ensure an optimized allocation of the necessary resources and connectivity. Shatzkamer et al (US 2014/0317261 A1) describe one way of implementing such an NFV Orchestrator function.

Service demand may be volatile and difficult to predict. As a consequence, a service may not be available because too few resources are available or resources may be underutilized because a service is less popular than predicted. The NFV Management and Orchestration functionality is able to coordinate the management of the resources relevant for execution of an incoming SFC. However, if resources are not already readily available (pre-allocated) for the network service represented by the SFC when the SFC is entering the NFV Orchestrator, it will take a long time (minutes to hours) before the needed resources are freed and allocated and the SFC can actually be executed and the service instantiated. This delay adds to the delay already introduced by having the SFC travel through the complete network (from user equipment all the way to the operators backend systems) before it enters the NFV Orchestrator. Network operators therefore excessively pre-allocate resources so that SFCs can be executed faster and with a larger chance of success. This is a waste of resources.

In addition, it is possible that an incoming SFC in the NFV Orchestrator turns out to be already instantiated, or close to be instantiated (e.g. the VNFs are already there on the right VMs, but they need to be configured slightly differently). It takes a long time before NFV Management and Orchestration functionality becomes aware of this fact and then decides to do almost nothing. Or, on the contrary, the NFV Management and Orchestration functionality decides to pre-configure and/or pre-load various VNFs already, before the SFCs are received, as a way of pre-provisioning the service because it expects many SFC s to arrive in the future. This is again a waste of resources.

SUMMARY

The present disclosure aims to improve efficiency in the use of resources to meet service demands when deploying network services.

To that end, in one aspect, a computer-implemented method for controlling on-demand service provisioning from a network is disclosed, wherein the network comprises resources for providing a service. In the method, a service request is intercepted. At least one network function, indicated as a first network function, required for the service associated with the service request is determined. Then, the first network function is instantiated on a resource in the network for executing the service from the network.

Another aspect of the disclosure relates to a computer program or suite of computer programs comprising at least one software code portion or a computer program product storing at least one software code portion, the software code portion, when run on a computer system, being configured for executing the method disclosed herein.

Yet a further disclosed aspect pertains to a service control node configured for controlling on-demand service provisioning from a network. In one example, the service control node comprises a processor for performing one or more of the steps of the disclosed method, including intercepting a service request for providing the service, determining at least a first network function required for the service associated with the service request and instantiating the at least first network function in the network.

The disclosed method and system enable network functions of a service to be instantiated on-demand, i.e. triggered by receipt of the service request. Hence, it is not required to pre-load and/or pre-configure a network function of a service in a network on the basis of estimated demand for the service. As a consequence, an improved efficiency in resource usage in the network is obtained.

It should further be appreciated that the instance of a network function may comprise at least one of assigning further resources to a network function that is already being executed in the network and initiating a new function in the network.

It should further be appreciated that multiple network functions can be embedded in the same hardware equipment and multiple instances may exist of a particular function.

Further aspects of the disclosure include a service manager, a token application node, and a service request transmitter.

The service manager includes an interface for communication with the service control node and is configured to receive a request for a service function chain template over the interface from the service control node, to retrieve the service function chain template from a memory or generate the service function chain template, wherein the service function chain template comprises an ordered set of interconnected network functions associated with the service, the set containing the at least one first network function and to provide the service control node with the retrieved or generated service function chain template.

The token application node is configured for network function routing of data packets associated with the service request to at least the first network function instantiated in the method disclosed herein.

The service request transmitter is configured for analysing data packets, determining a service identifier from the data packets, generating the service request on the basis of the determined service identifier and transmitting the generated service request.

The service manager, token application node and service request transmitter may be used to further improve the method as disclosed herein, but may also be used for different purposes.

It should be appreciated that the network functions may be provisioned in the telecommunications network itself, in a data centre of the telecommunications provider or in a third party cloud data centre. If the service is provided in the telecommunications network, the service control node is also located in the telecommunications network.

A still further aspect of the disclosure pertains to a telecommunications network configured for controlling on-demand service provisioning, wherein the service control node, the service manager, the token application node and the service request transmitter may be collocated with nodes in the telecommunications network or in the user device connected to the telecommunications network. The location of the service control node, the service manager, the token application node and the service request transmitter is selected in dependence on at least one of the service, the topology of the telecommunications network, the location where the service request may be intercepted in an appropriate manner, resource availability, connection conditions, security considerations etc. The token application node and service request transmitter in the network are typically located along the path traversed by user data packets. The token application node and the service request transmitter are not necessarily collocated in the same node. The token application node may e.g. be located at the beginning of the service function chain, e.g. at the ingress node of a cloud data centre.

An advantage of locating one or more of the nodes in the telecommunications network is that nodes of the telecommunications network may already possess useful information. For example, the HSS contains subscriber information and the MME contains mobility information.

In one embodiment, the method comprises determining a second network function required for the service associated with the service request. It is verified whether the second network function is instantiated in the network, i.e. whether the second network function is present in the network and whether sufficient resources for executing the second network function are available to accommodate the service request. When the second network function is instantiated in the network, the instantiated second network function is used for executing the service from the network associated with the service request. When the second network function has not yet been instantiated in the network or is not available, instantiation of the second network function in the network is then performed for executing the service from the network.

It is noted that the terms first network function and second network function have been used to identify the different (instances of) network functions and not to convey a sequential order. Also the instantiation of these functions may be in any order or be performed simultaneously. Also, the first network function is not necessarily the first network function in a service function chain.

Whereas the network function(s) may be executed on dedicated machines running or instantiated to run software for executing the network function(s), in one embodiment at least one network function is a virtual network function. Advantages of virtual network functions include scalability of the function and the possibility to share a single network function with multiple configurations by means of its multiple instances.

In one embodiment, the service request is received from a user device. The user device may comprise any device for requesting a service, including a smartphone, a tablet computer, etc. Such an embodiment is beneficial for services offered by a network provider. In another embodiment, the service request is received from a network node in a network (such as the telecommunications network), which service request is triggered by intercepting a service identifier in data packets running through the network node. Such an embodiment is advantageous for over-the-top services, including services as Netflix® and YouTube®. In both embodiments, the service request may be detected or intercepted by a service control node.

In one embodiment, a service function chain template is obtained comprising an ordered set of interconnected network functions associated with the service, the set containing the at least one first network function and further e.g. the second network function as described above. The service function chain template may e.g. be stored in a service manager or elsewhere. The service function chain template may already exist or be generated in response to the service request. The service provider may access the service manager to create a new service function chain template or manipulate existing service function chain templates for his service(s). An advantage of a service function chain template is that a plurality of functions and the execution order thereof can be identified for a service in response to a single service request. The service function chain template may comprise network functions that should still be instantiated, such as the first network function referred to above, and functions that are already present and available in the network.

In one embodiment, the applicable service function chain template is selected on the basis of the service request. One example includes selecting the template on the basis of the service type of the service request. Examples of service types include: secure connection service, high data rate service, low latency service, private network service, private cloud service, priority service, etc. Another example includes selection of the template on the basis of a parameter, such as the location of the device of the user issuing the service request.

In one embodiment, the step of instantiating the first network service includes associating one or more forwarding rules with the first network function to determine the routing of a data packet after being processed by the first network function. Such an embodiment is, for example, beneficial when the first network function may be instantiated for multiple services and the routing from this first network function is different for data packets associated with different services. Forwarding rules may also be associated with the ingress of the service function chain in order to route data packets to a network function that is first in the service function chain.

In one embodiment, a network function routing token may be generated that may be applied to data packets by a token application node once one or more network functions have been determined for the service and the network functions have been instantiated in the network. The network function routing token is a communication protocol independent token that is decoupled from the underlying network and relates instances of the network functions to a service instantiation. The generated token may be applied to data packets associated with the service request for routing the data packets to the at least first network function.

In one embodiment, the token is a multi-level token (a hierarchical token) comprising at least a first level and a second level, wherein the first level distinguishes between service function chain template instantiations comprising ordered sets of interconnected network functions and the second level distinguishes between network functions, or instances thereof, within an instantiated service function chain template. The hierarchical token enables routing of data packets associated with a service from one network function to another.

In one embodiment, the service request relates to a telecommunications network service, such as a LTE_EPC network service comprising an S-GW network function, a P-GW network function and/or an MME network function. This embodiment enables provisioning of a virtualized network service, i.e. a virtual telecommunications network service.

In one embodiment, the instantiated first network function may be terminated. This step may e.g. be performed from the service control node and enables efficient use of resources by terminating network functions that are no longer required or reducing resources assigned to such network functions, thereby freeing capacity for instantiating other network functions or assigning extra capacity to network functions with growing capacity demands.

As will be appreciated by one skilled in the art, one or more steps of the present disclosure may be embodied as a system, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present disclosure may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Embodiments of the present invention will be further illustrated with reference to the attached drawings, which schematically will show embodiments according to the invention. It will be understood that the present invention is not in any way restricted to these specific embodiments.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
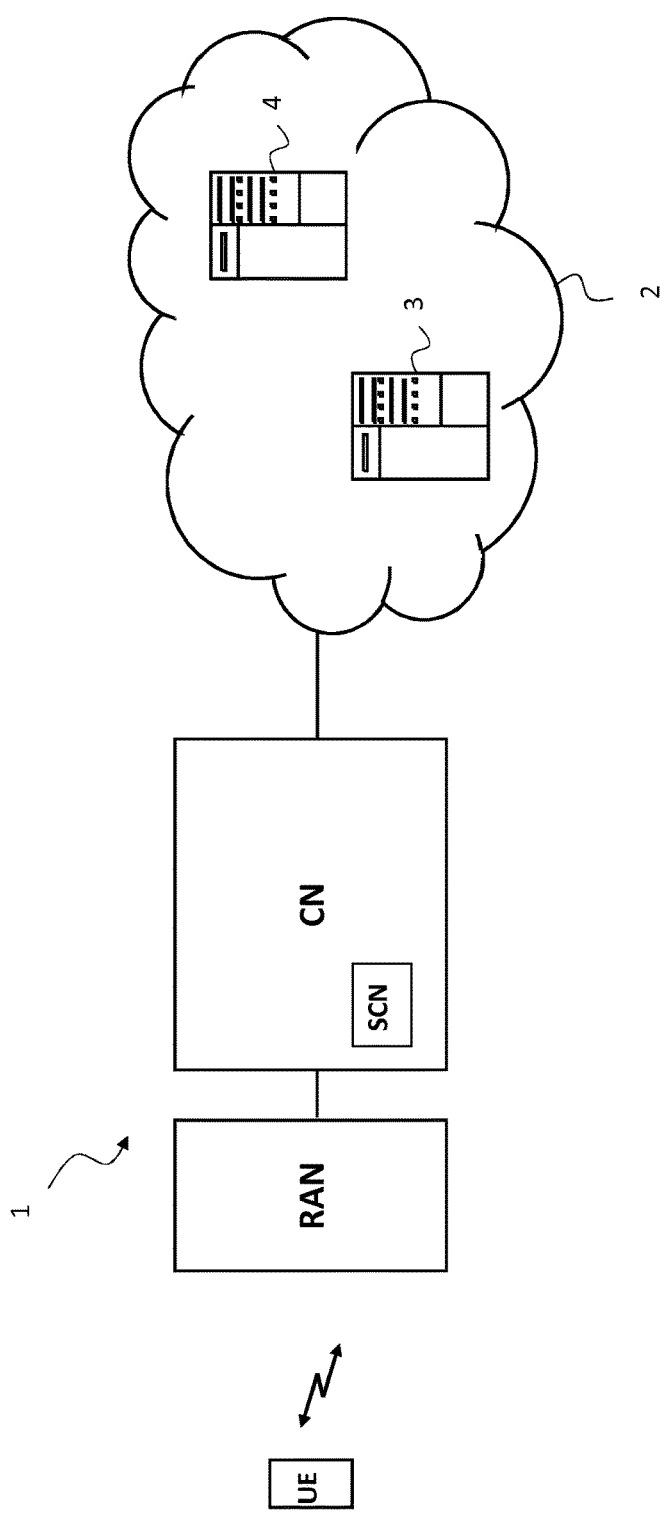
FIG. 1 shows a schematic illustration of a system comprising a service control node according to one disclosed embodiment.

FIG. 1 shows a system comprising a telecommunications network 1 connecting a user device UE to a packet data network 2, such as the internet or a closed packet data network of a telecommunications operator.

The telecommunications network 1 comprises a radio access network RAN, e.g. a 3G UTRAN or a 4G E-UTRAN, and a core network CN. A more detailed description of the architecture and overview can be found in 3GPP Technical Specification TS 23.002 'Network Architecture' which is included in the present application by reference in its entirety.

The packet data network 2 comprises computing resources, indicated as servers 3, 4 in FIG. 1. Server 3 may e.g. represent a data centre of the operator of telecommunications network 1 (for example to provide value added services (VAS)), whereas server 4 may e.g. represent a third party cloud data centre. Resources 3, 4 may be configured to provide network function virtualization (NFV). The telecommunications network 1 is provided with a service control node SCN configured to enable on-demand service provisioning in the network 2 using resources 3, 4 or in the telecommunications network 1. Embodiments and functions of the service control node SCN will be described in further detail below.

Figure 2:
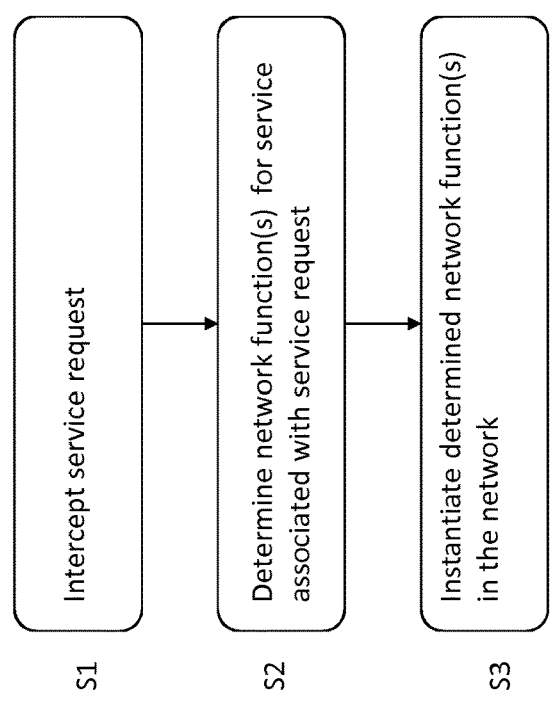
FIG. 2 is a flow chart illustrating some step of an on-demand service provisioning method according to a disclosed embodiment.

FIG. 2 depicts a flow chart illustrating some steps of a method for on-demand service provisioning in a network, such as packet data network 2.

In step S1, a service request is intercepted. The service request may e.g. be a request for a secure connection service, a high data rate service, a low latency service, a private network service, a personal cloud service, a priority service, etc.

In step S2, at least one network function required for the service associated with the service request is determined. The service may require one or more network functions to be executed in the network 2. Determination of the at least one network function may be done on the basis of the service type indicated in the service request. Other parameters on the basis of which the at least one network function can be determined include the location of e.g. the user device UE.

In step S3 the at least one network function is instantiated on a resource in the network 2 for executing the service. Instantiation of the network function is required to execute the service if no instance of the network function is present in the network 2. Multiple network functions may be instantiated if the service requires this and no instances of these network functions are present in the network 2.

The disclosed method and system enable network functions of a service to be instantiated on-demand, i.e. triggered by receipt of the service request. Hence, it is not required to pre-load and/or pre-configure a network function of a service in a network on the basis of estimated demand for the service. As a consequence, an improved efficiency in resource usage in the network is obtained. The method and system are based on the concept of intercepting the service request well before it enters the service manager SM, for instance by implementing the intercepting function in the network close to the user equipment in the form of a Service Control Node (SCN). The SCN is able to interpret the service request up to a level that it knows how to allocate (or to trigger the allocation mechanism for) the necessary resources for that service request (e.g. by being directly instructed by the network operator, or by checking the matching SFC template provided to the SCN by e.g. the SM). It then starts the allocation functionality immediately, so that when the SFC is processed by the service manager SM, the SFC can successfully and easily be executed as the resources have been successfully pre-allocated on demand. In addition, the SCN is able to recognize already instantiated or missing VNFs in the network, and configure respectively load them on-demand, and as such simplify and speed up the work for the service manager SM considerably.

As will be discussed later, network functions may also be instantiated in network 1.

Figure 3A:
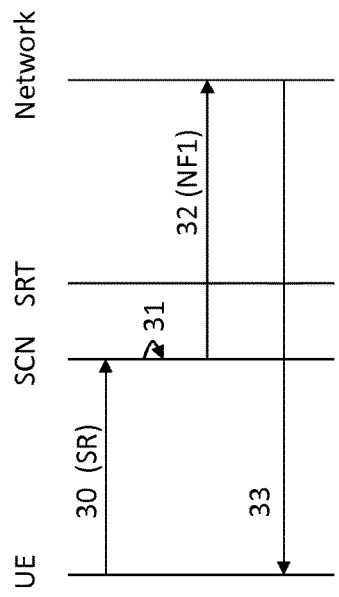
FIGS. 3A and 3B are time charts according to disclosed embodiments indicating communication with the service control node of the system of FIG. 1.
Figure 3B:
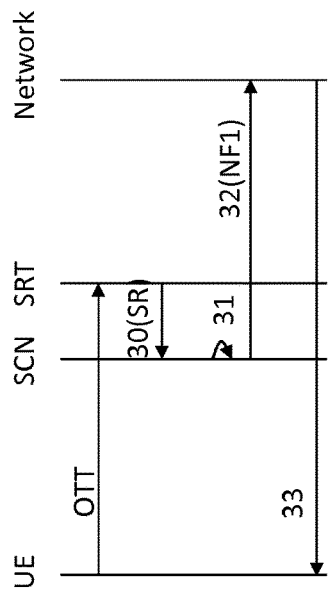

FIGS. 3A and 3B depict time charts for executing on-demand service provisioning control as described with reference to FIGS. 1 and 2.

In FIG. 3A, the service control node SCN in the telecommunications network 1 detects or intercepts a service request SR from user device UE in communication 30.

The service control node SCN determines at least one network function for performing the service associated with the service request SR in process 31.

In communication 32, the service control node SCN instantiates the network function NF1 in the network 2.

Communication 33 indicates provisioning of the service using the instantiated network function NF1.

In FIG. 3B, the service control node SCN in the telecommunications network 1 detects or intercepts a service request SR from within the telecommunications network 1 (or a service request from the network 2) in communication 30. The service request may be transmitted by a service request transmitter SRT upon detection and interception of an over-the-top OTT session establishment from user device UE. Actions 31-33 in FIG. 3B correspond to the likely referenced steps in FIG. 3A.

Figure 4:
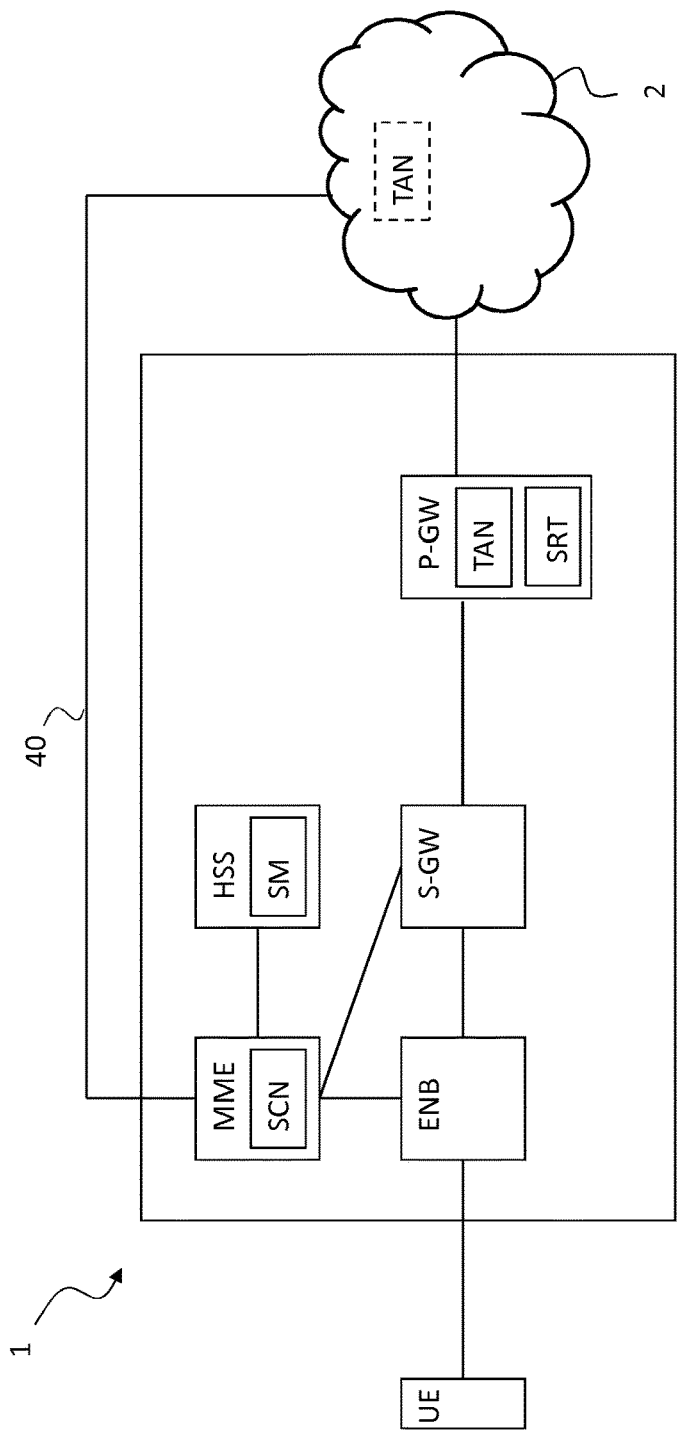
FIG. 4 is another schematic illustration of a disclosed embodiment of a system for performing on-demand service provisioning.

FIG. 4 is a schematic illustration of an on-demand service provisioning system comprising the service control node SCN, a service manager SM and a token application node TAN. The service manager SM has comparable functionality as the NFV Management and Orchestration functionality in ETSI NFV. The system also comprises a service request transmitter SRT to enable generation of service requests in the telecommunications network 1 as described with reference to FIG. 3B.

The telecommunications network 1 in this example comprises a 4G telecommunications network as well-known to the skilled person and comprises well-known nodes, such as an evolved Node B (ENB) enabling wireless access for the user device UE, a mobility management entity MME, a home subscriber server HSS, an S-GW serving a plurality of ENBs (not shown) and a P-GW as a gateway to the packet data network 2.

Whereas the service control node SCN is collocated with the MME in FIG. 4, the service control node SCN may be located elsewhere, such as in the user device UE, or in a user plane node such as a base station (e.g. the ENB). The token application node TAN and the service request transmitter SRT are located in the path of the data packets associated with the service, such as in a base station (e.g. the ENB), or in a gateway (such as the S-GW or the P-GW). An advantage of locating one or more of the nodes in the telecommunications network 1 is that nodes of the telecommunications network 1 may already possess useful information. For example, the HSS contains subscriber information and the MME contains mobility information.

The service control node SCN interacts with the service manager SM and the token application node TAN to provide on-demand services by instantiating network functions in the network 2, if such network functions are not already available in the network for satisfying the service request SR. Instantiation of network functions may be performed over connection 40. Instantiation of network functions may also be performed from the service control node through the telecommunications network 1 via the P-GW (or any other gateway to the second network).

In particular the provisioning of services in the network comprises instantiating new network functions, scaling existing network functions, initializing service differentiation tunnels.

The service control node SCN may also terminate network function instances, for example triggered by the end of a service request flow or upon expiry of a timer. In general, the service control node SCN is responsible for life-cycle management of the network function instances. In The service control node SCN is configured to receive and authorize service requests SR. The SCN has access to authorization information (e.g. database access, e.g. the HSS). It uses this information to determine whether a user is actually authorized to use a specific service that he requests (e.g. subscriptions, SLA agreements, data limits). If a user is not authorized, the SCN will not provision the service.

A service request SR may comprise an indication to a network operator for a desired network service. The indication may be header information or a packet data pattern. The service request SR may be an existing message, such as the initial attachment request to a telecommunications network 1, a pre-defined tag, e.g. a service identifier, embedded in protocols or signaling (such as HTTP or IMS), or a dedicated protocol.

The service control node SCN may be located at various places in the network depending on the method to receive service requests. For example, the service control node SCN can be located on the user device UE when the bootstrapping of a service can be indicated via a dedicated application layer protocol. Another option is to locate the service control node SCN at the ENB or the MME in the telecommunications network 1 of a mobile network monitoring signaling traffic. In this case, the service control node SCN might trigger on existing signaling messages or intercept protocol embedded service identifiers as a service request SR.

The service control node SCN is configured to dispatch a service request SR to the service manager SM to determine the one or more network functions NF for executing the service. The service manager SM retrieves or creates a service function chain (SFC) template TMPL, as will be further explained with reference to FIGS. 7-10. To that end, the service manager SM maintains a list of known services, their configurations (SFCs), and other possible information associated with each service (e.g., billing, users, policies). The service manager SM may interface with third parties delivering the services (in the form of an SFC, for example)

and with relevant network elements and other components to load and execute the service, such as cloud brokers, P-GWs, ENBs etc.

The service control node SCN is configured to receive the service function chain template, to compile the template and to instantiate network functions NF in the network 2. As will be explained below, network function(s) NF may also be instantiated in telecommunications network 1.

The service control node SCN is configured to generate a network function routing token for routing of data packets associated with the service to the determined network functions NF. The service control node SCN is configured to provide the token application node TAN with the generated network function routing token.

The token applier TAN is configured to receive the network function routing token from the service control node SCN and to apply the received token to the data packets (e.g. to the header of the data packets) to enable routing of the data packets along the chain of network functions NF as defined in the service function chain template TMPL. This enables token-based service flow-routing. The token applier TAN is logically located at the ingress node of a service function chain, e.g. at the ingress node of cloud data centre 3 or 4. The token application node TAN may, accordingly, be located in network 2 (as illustrated by dashed lines in FIG. 4).

As already explained with reference to FIG. 3B, the service request SR may also originate from within the telecommunications network 1 (or from the network 2). To that end, a service request transmitter SRT is arranged in the telecommunications network 1. The service request transmitter SRT may be configured to intercept or arranged to be informed of over-the-top (OTT) service requests and other requests, e.g. on the basis of a service identifier in traffic from the user device UE. The service identifier may e.g. have been embedded by the user device UE or a web server in the service request from the user device UE (e.g. an http request that points to a given server/service). In response to the interception or receipt of the information, a service request SR is generated and transmitted to the service control node SCN.

Figure 5:
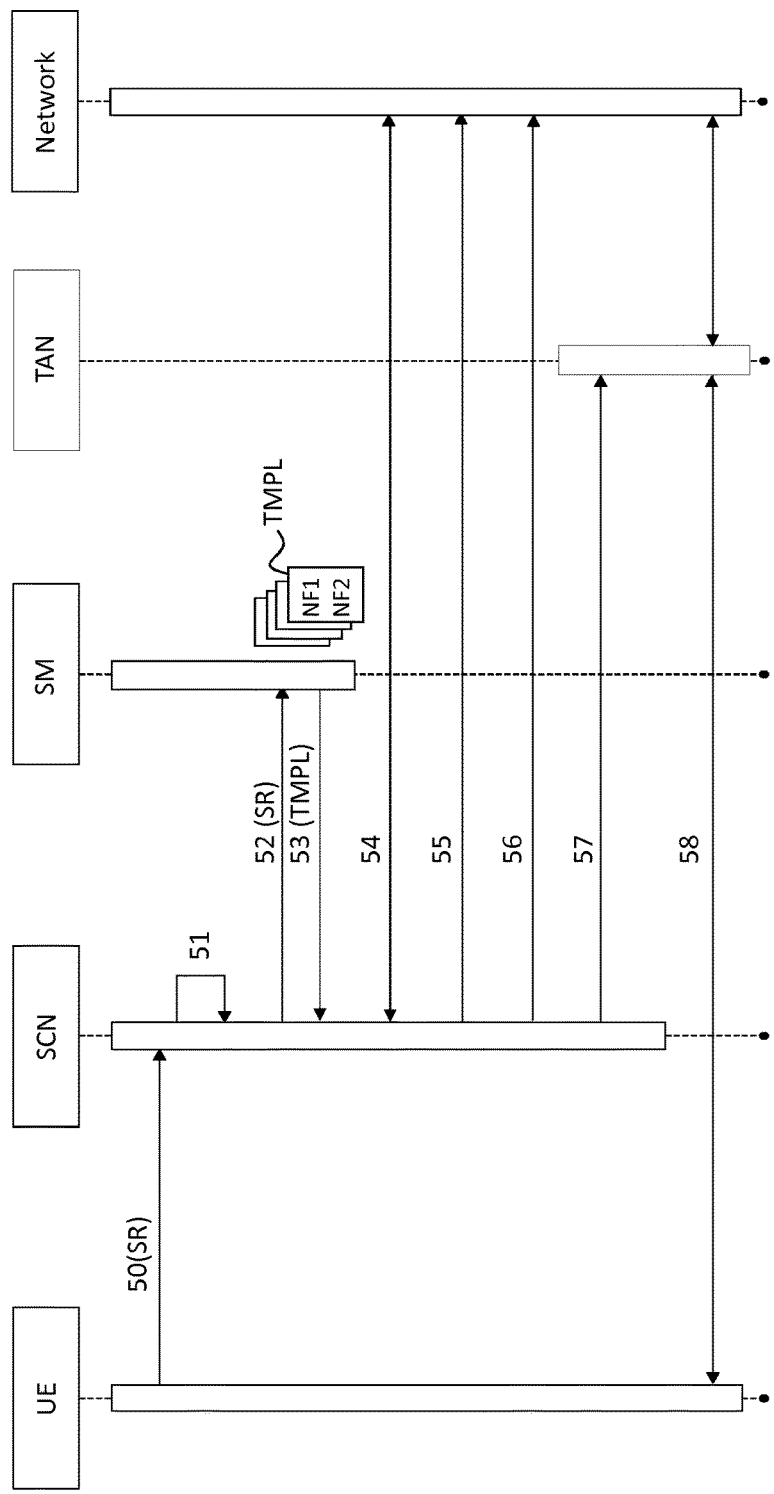
FIG. 5 is a time chart indicating some communications between nodes of the system of FIG. 4.

A method of operating the service control node SCN, the service manager SM and the token application node TAN in the system of FIG. 4 is depicted in FIG. 5.

First, in communication 50, a service request from user device UE is intercepted by the service control node SCN. The service control node SCN detects the service type in process 51, for example based on packet header fields (e.g., port, target IP address) or packet content.

The service type is subsequently used to request an SFC template TMPL from the service manager SM in communication 52. The service manager SM is configured to translate the service request SR, or a derivative thereof derived in the service control node SCN, into a set of interconnected network functions, i.e. a service function chain (SFC) template. This translation can be handled in multiple ways. For example, SFC templates may have been created manually for each service type used within its network. Alternatively, automated translation algorithms could be used to create SFC templates on the fly.

In communication 53, a template TMPL is returned indicating the order and descriptions of the involved network functions, e.g. NF1, NF2. Based on this SFC template, the service control node SCN determines the set of network functions to provide the customer using user device UE with the requested service. In addition to information obtained from the service manager SM, the service control node SCN may further process the information and add or set further features. E.g. the SCN may generate multiple instances of a network function of the SFC template, if necessary and determine the network function routing. Also, user specific configurations of the templates may be determined by the service control node SCN.

Using service discovery mechanisms in communication 54, the service control node SCN determines the set of network functions listed in the template TMPL that are currently running in the network 2, e.g. in the domain's cloud datacentres 3 (see FIG. 1). From the service discovery, the service control node SCN may verify that network function NF 2 is already running in the network and that sufficient resources are available to accommodate the service request SR for this network function. At the same time, the service control node SCN finds out that network function NF1, also listed in the template TMPL, does not yet exist in the network 2 (or that insufficient resources are available in the network to accommodate the service request SR for this network function).

Hence, in a next communication 55, the service control node instantiates a new network function instance NF1.

Subsequently, the necessary resources are provisioned for the selected network function instances in communication 56, as well as the network interconnecting them in order to accommodate the user's service request. Since the network functions may be distributed (e.g. over multiple racks, data centres, networks), resources should be allocated to obtain a network path through the network functions.

During a final step of the on demand service provisioning process, communication 57, the service control node SCN configures the routing path for the service flows associated with the service request SR from the user device UE. This routing configuration enables that the data packets associated with the service request are redirected to network function NF1 and subsequently to network function NF2 according the specifications of the SFC template. To that end, the service control node SCN provides a network function routing token to the token application node TAN.

When the service is established and configured as described above, data packets associated with the service request flow from the user device UE via the token application node TAN to pick up the network function routing token for being routed to the service endpoint, as well as vice versa. The network function routing token is removed from the data packets at the egress of the SFC to obtain transparency for further networks in the path of the data packets.

The telecommunications network 1 of the operator itself (or another operator) may benefit from the ability to instantiate network functions based on user demand and the availability of resources. A core network CN service (see FIG. 1), such as the MME function, the S-GW function and/or the P-GW function, may be provisioned on demand by instantiating suitable network functions to obtain e.g. user specific versions of these nodes. The virtual functions are typically placed in a virtual core network CN cloud. The ability to instantiate a customized core network opens up opportunities for resource efficiency and customization, e.g. when users are moving within a telecommunications network 1 or roaming between telecommunications networks.

Figure 6:
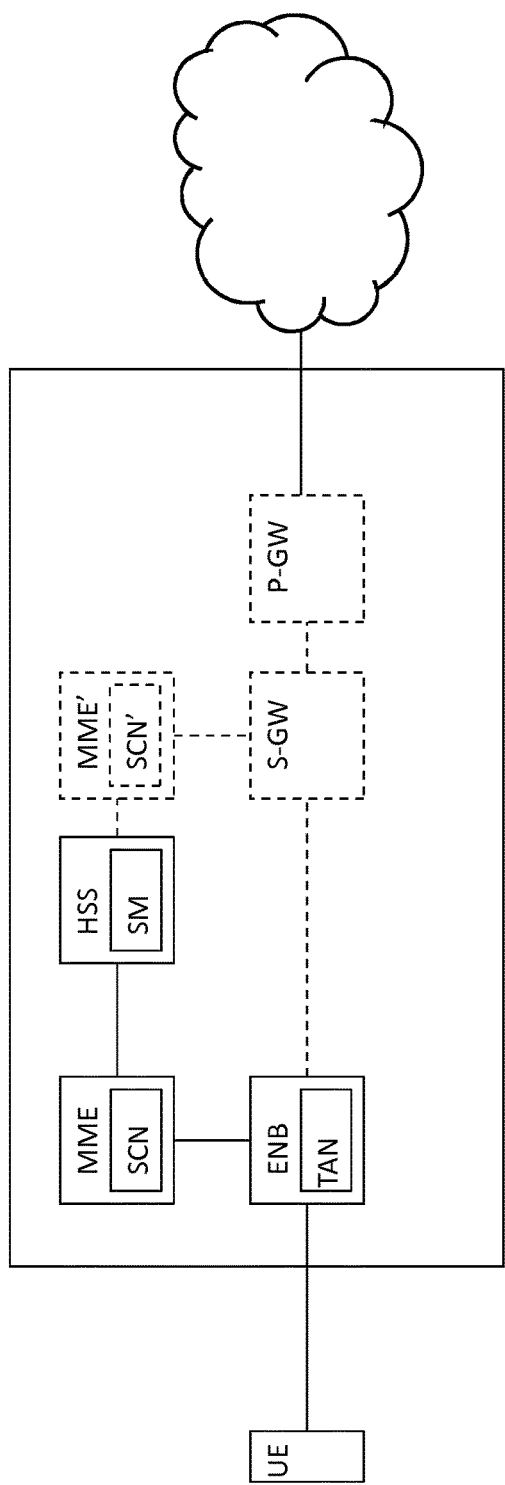
FIG. 6 is a schematic illustration of a system wherein services of a telecommunications system are provisioned using the disclosed method.

FIG. 6 shows an example of on-demand provisioning of MME, S-GW and P-GW functionality in a telecommunications network 1. The dashed boxes show the associated network functions to provide the on-demand core network service. It should be noted that even the service control node SCN itself can be instantiated in the virtual MME function, indicated as SCN'.

It is noted that it is not necessary a complete core network should be provisioned. It is also possible to provision only one or more nodes of such a core network using the method disclosed herein. One reason for a user device UE to request an individual version of an EPC service is that 3GPP is constantly evolving regarding new features and functions, e.g. Architecture Enhancements for Service Exposure (AESE). It means that a "standard" EPC will not suffice in providing services AESE is made for. Through the method disclosed herein, a telecommunication network provider is not required to deploy complicated AESE in the EPC, but simply includes templates for AESE and its included functional components in the SM. Accordingly, the provider may upgrade the network without actually having to roll out the components.

In short, the following steps are taken to provision the core network service. An initial request from the user device UE with a specific service request to the network arrives at the service control node SCN. The service control node SCN detects (using the service request from the UE) the required service type (in this case the UE-specific EPC service type) and requests an SFC template from the service manager SM e.g. located in the HSS. The service manager SM looks for/creates one or more SFC templates in accordance with the service request from the service control node (SCN) (a set of templates describes the requested EPC; multiple templates may be used when multiple forwarding paths exists, e.g. a path for data traffic and a path for control traffic). The service manager SM returns the one or more SFC templates and the service control node SCN compiles the templates into an SFC action deployment (including the instantiation of one or more network functions, such as the MME-function (possibly including an instance of the service control node SCN' itself to which a handover from the original SCN may be performed)). The original service control node SCN provides one or more network function routing tokens to the token application node TAN that may be collocated in the ENB.

Then, the standard MME handover procedure may be followed to switch signaling traffic to the newly created MME. Also, the connections for signaling among the newly created EPC are setup. The newly created MME' follows the standard 3GPP procedures to establish a bearer over the newly created EPC components and the data flow may start.

As mentioned above, the token application node TAN applies a network function routing token to the data packets associated with the service in order to route the data packets to the appropriate instances of network functions specified in the service function chain template TMPL.

Figure 7:
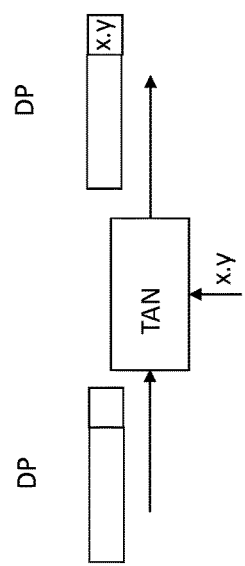
FIG. 7 illustrates a basic example of applying a network function routing token to a data packet.

In general, the data packets are routed to at least one instance of a network function (V)NF for performing a service running in a network. The network function (V)NF is assigned to at least one instantiation of a service function chain template TMPL. The method comprises applying a network function routing token x.y to each of the data packets for routing the data packets to the network function. Each network function routing token comprises at least a first level "x" indicative of the at least one instantiation of the service function chain template TMPL and a second level "y" indicative of the at least one instance of the network function (V)NF. This is schematically shown in FIG. 7, wherein a token application node TAN routes a data packet DP to an instance "y" of an instance of a network function contained in an instantiation of the service function routing template "x".

It should be noted that the network function routing token may comprise more than two levels.

The token application node TAN enables network function routing of data packets in case one or more instances of network functions are associated with one or more instantiations of service function chain templates for performing a service.

The network function routing token is a communication protocol independent token that is decoupled from the underlying network 1, 2 and relates instances of the network functions to a service as defined by the service function chain template.

It should be noted that instantiations of templates may differ because the templates contain one or more different functions, a different order of one or more of the same functions and/or the same function(s) with different setting(s). Instances of network functions may differ because the network functions differ and/or the setting(s) of the network functions differ. The instantiations of the templates and/or instances of the network functions are known when the network function routing token is generated. It should be noted that the network function routing tokens can be embedded into packets in multiple ways. For example, in IPv4, the options field can be used. This is an optional part of the IPv4 header, containing a set of 32-bit words. In IPv6, so-called header extensions can be used instead. These header extensions serve the same purpose as the options header field in IPv4, but are more modular and extensible.

Figure 8:
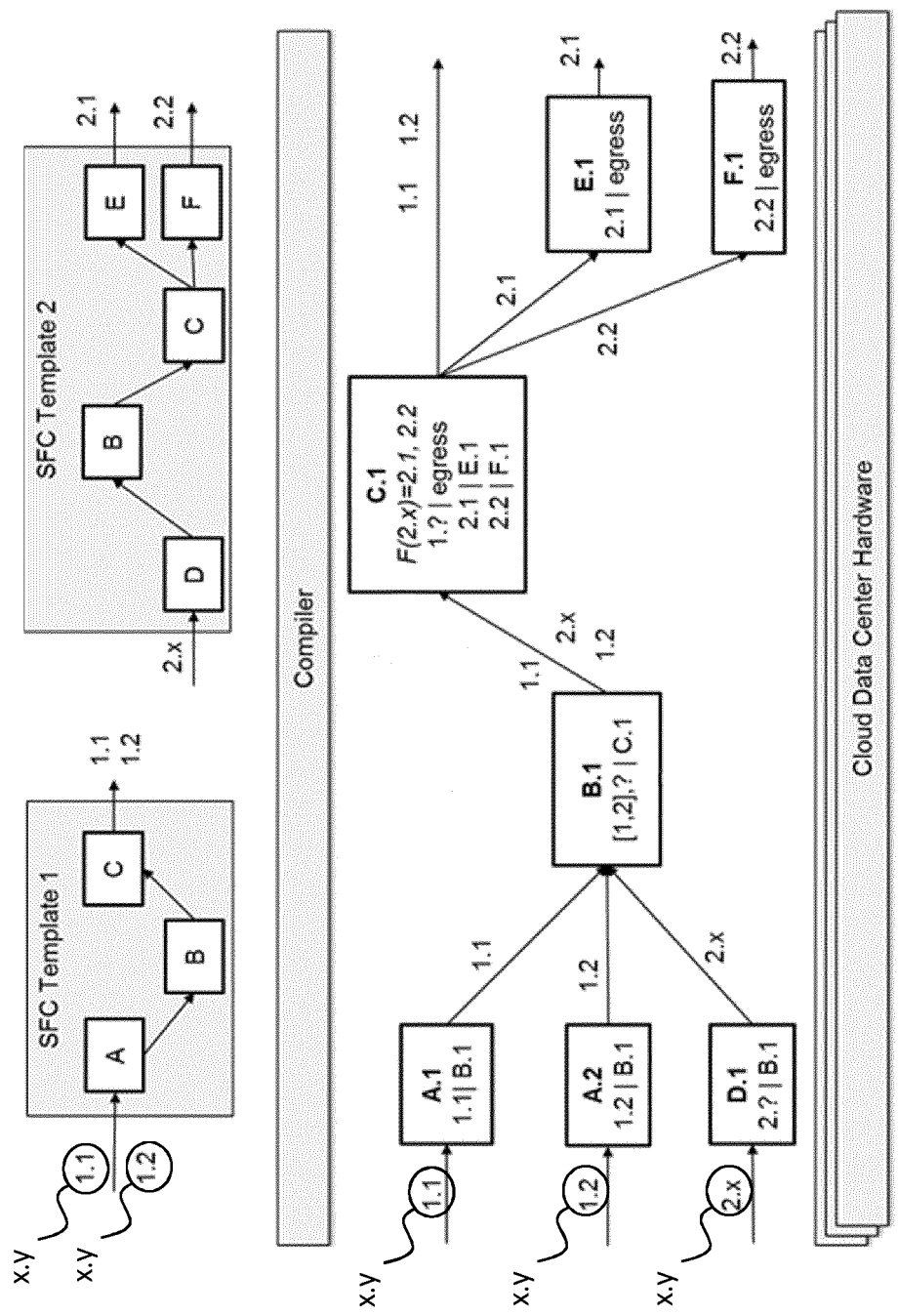
FIG. 8 illustrates an example of network function routing using multi-level tokens.

FIG. 8 illustrates an example of network function routing using multi-level tokens.

The top portion of FIG. 8 illustrates an SFC Template 1 and an SFC Template 2 each comprising a graph of interconnected network functions. In this embodiment, the instantiation of a service function chain template SFC Template 1 contains a plurality of instances of the network functions A, B and C for a particular service and a second instantiation of a service function chain template SFC Template 2 contains a plurality of instances of network functions D, B, C, E and F for another type of service in the order shown in FIG. 8. Note that NFs B and C are present in both templates (i.e. the services associated with them both use these functions).

As can be observed from FIG. 8, the first instantiation of the service function chain template SFC Template 1 and the second instantiation of the service function chain template SFC Template 2 differ in at least one instance of a network function. The first level of the network function routing token X differentiates between the first instantiation of the service function chain template SFC Template 1 and the second instantiation of the service function chain template SFC Template 2. As noted above, the difference in the at least one instance of the network function may also appear from the order of the instances of the network functions in the service function chain templates. The embodiment enables routing data packets associated with different services distinguished by the difference in service function chain templates as will be explained now.

Once the service control node SCN receives the service function chain template, the template is compiled into an action deployment by linking the abstract network functions to actual network functions deployed within e.g. the cloud data centre 3 or 4 as shown at the bottom of FIG. 8. The network functions are denoted by X.Y, wherein X is the NF type (e.g., A or B) and Y is the instance number (e.g., 1 or 2).

Forwarding rules (written as X|Y, where X=match with packet header token and Y=next hop NF) between NF instances are associated with one or more of the network functions, e.g. during instantiation of the network function. Regular expressions can be used to build complex filtering rules.

In FIG. 8, a two-level hierarchical token is used. The first level of the token is used to differentiate between SFC Template 1 and SFC Template 2. In the example, two instances of NF A exist, denoted as instances A.1 and A.2. The second level of the token associated with SFC Template 1 is used to differentiate between these two instances of NF A.

In SFC Template 2, the second level is used to direct data packets either to NF instance E.1 or F.1. In the latter case, the forwarding decision is based on a distinguishing factor that can be interpreted by a network function node within the SFC Template 2, e.g. on network function C.1 in the example. Network function C.1 interprets the distinguishing factor to decide whether to route packets marked with token 2.x to E.1 or F.1. The NF C1 may update the network function routing token such that the distinguishing factor can be used also by NFs downstream of it (2.1 and 2.2 in the example). An example of such a distinguishing factor is a user characteristic or a certain context (e.g. male/female), or a local service level agreement.

An alternative option would be to make use of two separate SFC templates, i.e. one for the branch comprising NF E and one for the branch comprising NF F. Such an embodiment would be beneficial if the distinguishing factor can be interpreted at the ingress node of the SFC and can be set by the token application node TAN.

When a specific level of a network function routing token is not relevant or a range of network functions is to be identified, a wildcard can be used in the token in the packet header, e.g. (1.?). In this example, the data packet must obey SFC Template 1, but is free to select the next hop for the second hierarchical level (e.g. which NF-instance A.1 or A.2 to use). In forwarding nodes, also other regular expression semantics can be supported, such as alternative options, e.g., "[12].?", which is a route summary for expressing that all traffic marked with tokens 1.? and 2.? is treated in a similar way.

Figure 9:
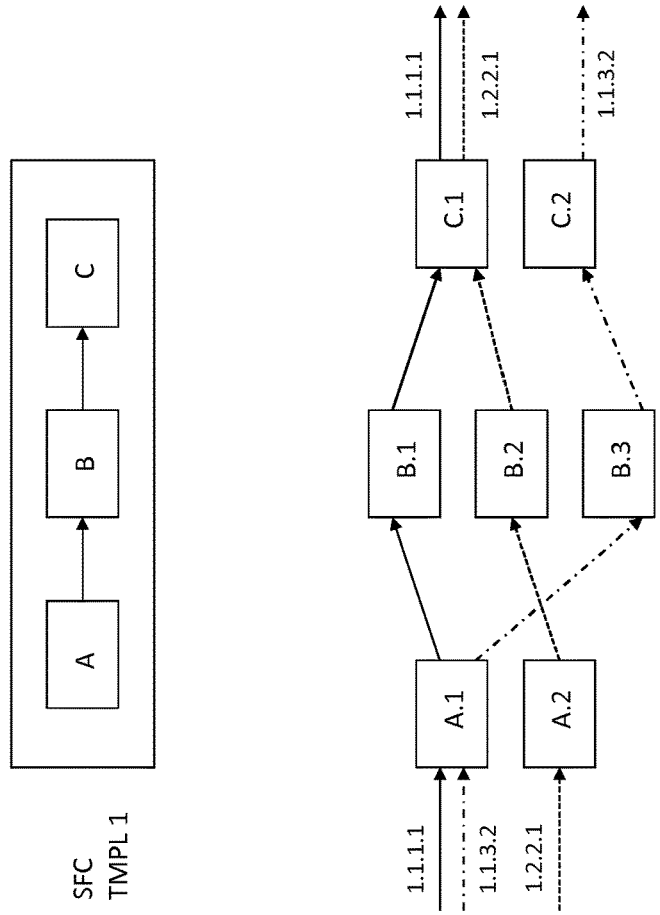
FIG. 9 illustrates another example of network function routing.

FIG. 9 is a schematic illustration of a network function routing token comprising more than two levels.

In one embodiment, a service function chain template again contains an ordered set of interconnected network functions and the second and further levels of the network function routing token correspond to positions of the network functions in the ordered set. Accordingly, data packets can be routed to subsequent network functions in the network in accordance with the order of the network functions in the function chain template. Optionally, a value of the token at the second level corresponds to an instance of the network function at the position in the ordered set.

In FIG. 9, again, the first level distinguishes between SFC templates. The second and further levels, (the token has N+1 levels), distinguish between different instances of (virtual) network functions (e.g. between instances of a specific NF or between different NFs based on e.g. a locally interpretable distinguishing factor).

The number of hierarchical levels that can be used in the token could be set to N+1, where N is the number of consecutive NFs in the SFC Template (or: the length of the SFC template). (N+1)-level token based routing can be used to prescribe which instance of a VNF should be used at different steps in the SFC. An example of such a type of 4-level (N=3) token based routing is given in FIG. 9. In FIG. 9, the three network functions A, B, C are included in that order in service function chain template "1" and, accordingly, the first level of the network function routing token is set to "1". The second and further levels of the token enable the data packets to distinguish between instances of these network functions within the SFC Template 1. E.g. the value of the second level distinguishes between instance A.1 and A.2 of network function A. The value of the third level distinguishes between instances B1, B2 and B2 of network function B, etc. The two instances A.1, A.2 of network function A may e.g. relate to different configurations of the network function A.

Multiple instantiations of a service function chain template may exist. One example was already given in the embodiment of FIG. 8 wherein the instantiations of the SFC templates differed by the difference in the network functions contained in the templates. Another example is given in FIG. 10A, wherein a single service function chain template 1 is instantiated multiple times resulting in different network function instances B1 and B2 for network function B. Network function instances B1 and B2 may, for example, be different because of different configurations of the network function B. The second level of the network function routing token determines whether the instantiation of the SFC template containing network function instance B1 or whether the instantiation of the SFC template containing network function instance B2 is traversed by a data packet. A similar effect would be obtained when two SFC templates would be defined, except that the differentiation is made on the first level of the token.

Figures 10A, 10B:
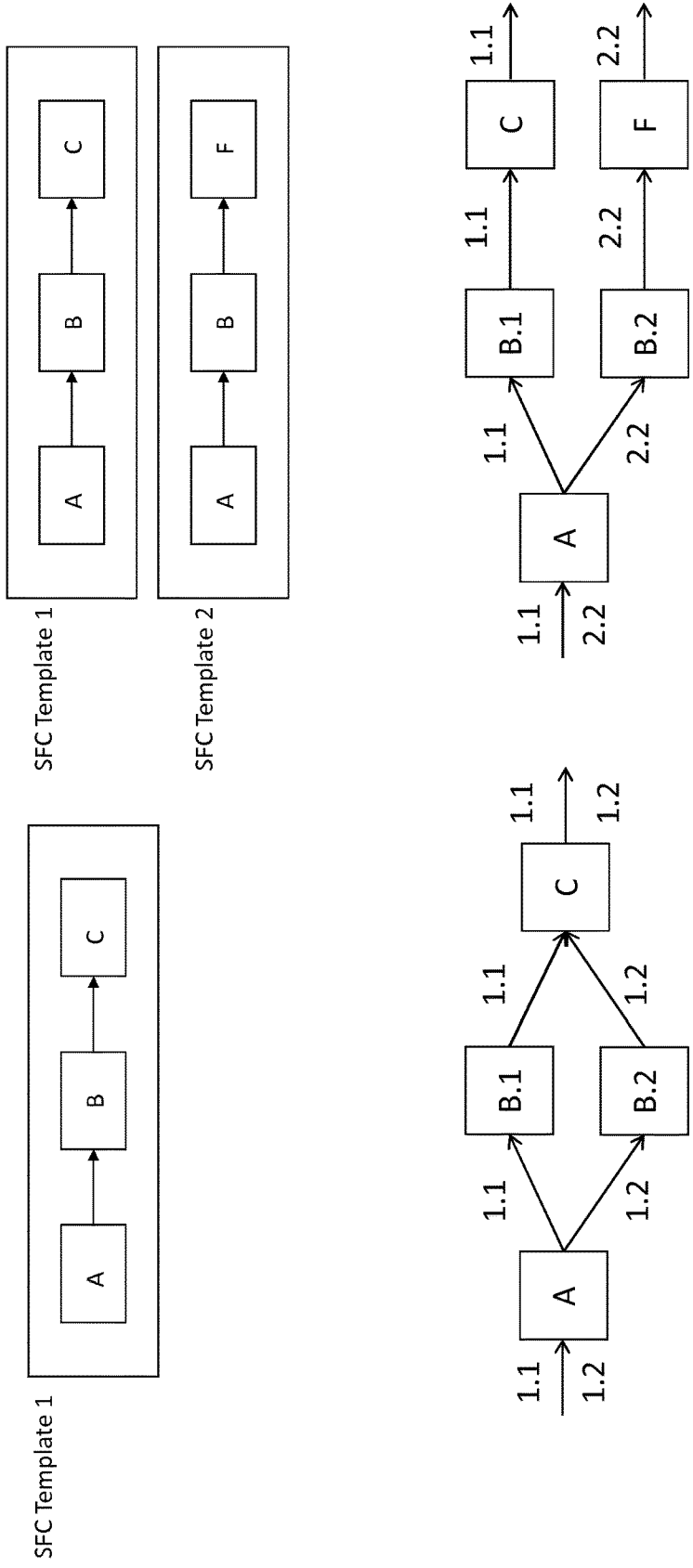
FIGS. 10A and 10B illustrate further examples of network function routing using multi-level tokens.

FIG. 10B depicts yet another embodiment of network function routing. Two SFC templates are defined. SFC Template 1 contains network functions A, B and C. SFC Template 2 contains network functions A, B and F. The first level of the network function routing token determines the SFC Template used. The second level determines the instance of the network function.

Figure 11:
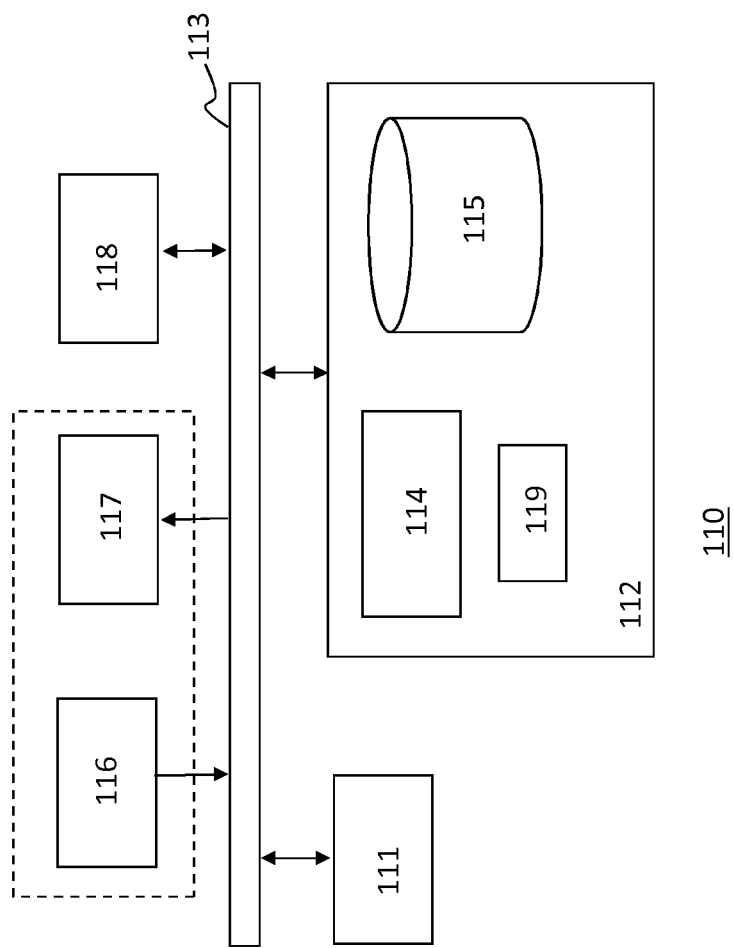
FIG. 11 is a schematic block diagram of a general system, such as the service control node.

FIG. 11 is a schematic block diagram of a general system, such as the service control node SCN, the service manager SM and/or the token application node TAN.

As shown in FIG. 11, the data processing system 110 may include at least one processor 111 coupled to memory elements 112 through a system bus 113. As such, the data processing system may store program code within memory elements 112. Further, the processor 111 may execute the program code accessed from the memory elements 112 via a system bus 113. In one aspect, the data processing system may be implemented as a computer that is suitable for storing and/or executing program code. It should be appreciated, however, that the data processing system 110 may be implemented in the form of any system including a processor and a memory that is capable of performing the functions described within this specification.

The memory elements 112 may include one or more physical memory devices such as, for example, local memory 114 and one or more bulk storage devices 115. The local memory may refer to random access memory or other non-persistent memory device(s) generally used during actual execution of the program code. A bulk storage device may be implemented as a hard drive or other persistent data storage device. The processing system 110 may also include one or more cache memories (not shown) that provide temporary storage of at least some program code in order to reduce the number of times program code must be retrieved from the bulk storage device 115 during execution.

Input/output (I/O) devices depicted as an input device 116 and an output device 117 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 116 and the output device 117). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 118 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 110, and a data transmitter for transmitting data from the data processing system 110 to said systems, devices and/or networks. Modems, cable modems, and Ethernet cards are examples of different types of network adapter that may be used with the data processing system 110.

As pictured in FIG. 11, the memory elements 112 may store an application 119. In various embodiments, the application 119 may be stored in the local memory 114, the one or more bulk storage devices 115, or apart from the local memory and the bulk storage devices. It should be appreciated that the data processing system 110 may further execute an operating system (not shown in FIG. 11) that can facilitate execution of the application 119. The application 119, being implemented in the form of executable program code, can be executed by the data processing system 110, e.g., by the processor 111. Responsive to executing the application, the data processing system 110 may be configured to perform one or more operations or method steps described herein.

In one aspect of the present invention, the data processing system 110 may represent a service control node SCN, a service manager SM or a token application node TAN as disclosed herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 111 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

In one embodiment, a method for routing data packets to at least one instance of a network function for performing a service running in a network is performed. The network function is assigned to at least one instantiation of a service function chain template. The method comprises applying a network function routing token to each of the data packets for routing the data packets to the instance of the network function. Each network function routing token comprises at least a first level indicative of the at least one instantiation of the service function chain template and a second level indicative of the at least one instance of the network function.

Another embodiment pertains to a token application node configured to execute the method. The token application node is configured for network function routing of data packets associated with a service to at least the one instance of a network function.

A still further embodiment relates to a service control node and to a service manager. In particular, the service control node is configured to obtain the service function chain template in response to detecting or intercepting a service request for providing the service and to instantiate or discover the at least one instance of the network function in the network. The service control node is configured to generate the network function routing token for each of the data packets associated with the service corresponding to the service request for routing the data packets to the instance of the network function. The service manager comprises an interface with the service control node to provide the service function chain template to the service control node.

A further embodiment relates to a telecommunications network comprising a token application node, a service control node and a service manager. The service control node, the service manager and the token application node may be collocated with nodes in the telecommunications network or in the user device connected to the telecommunications network. The location of the service control node, the service manager, the token application node may be selected in dependence on at least one of the service, the topology of the telecommunications network, the location where the service request may be detected in an appropriate manner, resource availability, connection conditions, security considerations etc. The token application node is typically located in the path traversed by user data packets.

An advantage of locating one or more of the nodes in the telecommunications network is that a node of the telecommunications network may already possess useful information. For example, the HSS contains subscriber information and the MME contains mobility information.

The disclosed embodiments enable network function routing of data packets in case one or more instances of network functions are associated with one or more instantiations of service function chain templates for performing a service.

In one embodiment, the network runs a plurality of instances of network functions. An instantiation of a first service function chain template contains one or more of the instances of the network functions and an instantiation of a second service function chain template contains one or more of the instances of the network functions, wherein the instantiation of the first service function chain template and the instantiation of the second service function chain template differ in at least one instance of a network function. In the embodiment, the first level of the network function routing token differentiates between the instantiation of the first service function chain template and the instantiation of the second service function chain template. As noted above, the difference in the at least one instance of the network function may also appear from the order of the instances of the network functions in the service function chain templates. The embodiment enables routing data packets associated with different services distinguished by the difference in service function chain templates.

In one embodiment, a service function chain template contains an ordered set of interconnected network functions and the second and further levels, if any, of the network function routing token correspond to positions of the network functions in the ordered set. Accordingly, data packets can be routed to subsequent network functions in the network in accordance with the order of the network functions in the function chain template. Optionally, a value of the token at the second level corresponds to an instance of the network function at the position in the ordered set. This embodiment enables distinguishing between multiple instances of a network function in the set at the same position in the order.

In one embodiment, the at least one instance of the network function is associated with a forwarding rule, wherein the forwarding rule determines the further routing of a data packet output from the at least one instance of the network function on the basis of the network function routing token. The forwarding rule corresponds to the chaining information from the service function chain template. Accordingly, the number of levels in the network function routing token does not need to correspond to the number of instances of network functions in the service function chain template.

In an embodiment, one or more levels of the network function routing token contains one or more wildcards. The embodiment enables flexibility when a specific level of a token is not relevant or a range of tokens is to be identified.

The invention claimed is:

1. A computer-implemented method for controlling on-demand service provisioning in a network comprising resources for providing a service, the network comprising a service manager configured for coordinating management of resources for execution of the service, the network comprising a core network, the method comprising:
   intercepting a service request in the core network for providing the service before the service request enters the service manager;
   determining at least a first network function required for the service associated with the service request;
   instantiating the at least first network function on a resource in the network for executing the service in the network;
   the service manager processing the service request.

2. The method according to claim 1, comprising
   determining a second network function required for the service associated with the service request;
   verifying whether the second network function is instantiated in the network;
   when the second network function is instantiated in the network, using the instantiated second network function for executing the service from the network associated with the service request;
   when the second network function is not instantiated in the network, instantiating the second network function in the network for executing the service from the network associated with the service request.

3. The method according to claim 1, wherein the first network function is a virtual network function.

4. The method according to claim 1, wherein intercepting the service request comprises one of:
   receiving the service request from a user device; and
   receiving the service request from a network node in a network triggered by an intercepted service identifier.

5. The method according to claim 1, comprising of obtaining a service function chain template comprising an ordered set of interconnected network functions associated with the service, the set containing the at least one first network function and, optionally, a network function that has been instantiated in the network.

6. The method according to claim 5, comprising obtaining the service function chain template on the basis of the service request.

7. The method according to claim 1, wherein instantiating the first network function includes associating one or more forwarding rules with the first network function to determine the further processing of a data packet output from the first network function.

8. The method according to claim 1, further comprising generating a network function routing token to be applied to data packets associated with the service request for routing the data packets to the at least one first network function.

9. The method according to claim 8, wherein the token is a hierarchical token comprising at least a first level and a second level, wherein the first level distinguishes between service function chain templates comprising ordered sets of interconnected network functions and the second level distinguishes between network functions, or instances thereof, within an instantiated service function chain template.

10. The method according to claim 1, wherein the service request relates to a telecommunications network service.

11. The method according to claim 1, comprising terminating the instantiated at least one first network function.

12. A computer program or suite of computer programs comprising at least one software code portion or a computer program product storing at least one software code portion, the software code portion, when run on a computer system, being configured for executing the method according to claim 1.

13. A service control node configured for controlling on-demand service provisioning in a network, the network comprising a core network, wherein the service control node is configured for:
  intercepting a service request in the core network for providing the service;
  determining at least a first network function required for the service associated with the service request;
  instantiating the at least first network function in the network.

14. A service manager comprising:
  an interface with the service control node according to claim 13,
  wherein the service manager is configured to:
  receive a request for a service function chain template over the interface from the service control node;
  retrieving the service function chain template from a memory or generating the service function chain template, wherein the service function chain template comprises an ordered set of interconnected network functions associated with the service, the set containing the at least one first network function;
  providing the service control node with the retrieved or generated service function chain template.

15. The service manager according to claim 14, further comprising an interface for creating and/or modifying the function chain template.

16. A token application node configured for network function routing of data packets associated with the service request to at least the first network function instantiated in the method according to one or more of the claim 1.

17. The token application node according to claim 16, wherein the node is further configured for inserting a network function routing token, optionally a hierarchical network function routing token, in a data packet, preferably in the header of the data packet, associated with the service request, wherein the network function routing token is, optionally, received from a service control node.

18. A service request transmitter configured for:
  analyzing data packets associated with the service;
  determining a service identifier from the data packets;
  generating the service request on the basis of the determined service identifier, and
  transmitting the generated service request.

* * * * *

UNITED STATES PATENT AND TRADEMARK OFFICE
CERTIFICATE OF CORRECTION

PATENT NO. : 10,581,703 B2
APPLICATION NO. : 15/538188
DATED : March 3, 2020
INVENTOR(S) : Strijkers et al.

It is certified that error appears in the above-identified patent and that said Letters Patent is hereby corrected as shown below:

In the Claims

Column 19, Line 66-Column 22, Line 22, (approx.) should read:

1. A computer-implemented method for controlling on-demand service provisioning in a network comprising resources for providing a service, the method comprising:
　　detecting in a service control node a service request from a user device for providing the service;
　　the service control node determining at least a first network function required for the service associated with the service request;
　　the service control node instantiating the at least first network function on a resource in the network for executing the service in the network;
　　the service control node redirecting data packets from the user device to the at least first instantiated network function for performing the service associated with the service request.

2. The method according to claim 1, comprising
　　the service control node determining a second network function required for the service associated with the service request;
　　the service control node verifying whether the second network function is instantiated in the network;
　　when the second network function is instantiated in the network, using the instantiated second network function for executing the service from the network associated with the service request;
　　when the second network function is not instantiated in the network, instantiating the second network function in the network for executing the service from the network associated with the service request.

3. The method according to claim 1, wherein the first network function is a virtual network function.

Signed and Sealed this
　　　　　　　　　　　　　　　　　　Second Day of June, 2020

Andrei Iancu
*Director of the United States Patent and Trademark Office*

CERTIFICATE OF CORRECTION (continued)
U.S. Pat. No. 10,581,703 B2

4. The method according to claim 1, wherein detecting the service request comprises one of:
   receiving the service request from a user device; and
   receiving the service request from a network node in a network triggered by an intercepted service identifier.

5. The method according to claim 1, comprising obtaining a service function chain template comprising an ordered set of interconnected network functions associated with the service, the set containing the at least one first network function and, optionally, a network function that has been instantiated in the network.

6. The method according to claim 5, comprising obtaining the service function chain template on the basis of the service request.

7. The method according to claim 1, wherein instantiating the first network function includes associating one or more forwarding rules with the first network function to determine the further processing of a data packet output from the first network function.

8. The method according to claim 1, further comprising generating a network function routing token to be applied to data packets associated with the service request for routing the data packets to the at least one first network function.

9. The method according to claim 8, wherein the token is a hierarchical token comprising at least a first level and a second level, wherein the first level distinguishes between service function chain templates comprising ordered sets of interconnected network functions and the second level distinguishes between network functions, or instances thereof, within an instantiated service function chain template.

10. The method according to claim 1, wherein the service request relates to a telecommunications network service.

11. The method according to claim 1, comprising terminating the instantiated at least one first network function.

12. A computer program or suite of computer programs comprising at least one software code portion or a computer program product storing at least one software code portion, the software code portion, when run on a computer system, being configured for executing the method according to claim 1.

13. A service control node configured for controlling on-demand service provisioning in a network, wherein the service control node is configured for:
   detecting a service request from a user device for providing the service;
   determining at least a first network function required for the service associated with the service request;
   instantiating the at least first network function in the network;
   redirecting data packets from the user device to the at least first instantiated network function for performing the service associated with the service request.

CERTIFICATE OF CORRECTION (continued)
U.S. Pat. No. 10,581,703 B2

14. A service manager comprising:
    an interface with the service control node according to claim 13,
    wherein the service manager is configured to:
    receive a request for a service function chain template over the interface from the service control node;
    retrieve the service function chain template from a memory or generate the service function chain template, wherein the service function chain template comprises an ordered set of interconnected network functions associated with the service, the set containing the at least one first network function;
    provide the service control node with the retrieved or generated service function chain template.

15. The service manager according to claim 14, further comprising an interface for creating and/or modifying the function chain template.

16. A token application node configured for network function routing of data packets associated with the service request to at least the first network function instantiated in the method according to claim 1.

17. The token application node according to claim 16, wherein the node is further configured for inserting a network function routing token, optionally a hierarchical network function routing token, in a data packet associated with the service request, wherein the network function routing token is, optionally, received from a service control node.

18. A service request transmitter configured for:
    analyzing data packets associated with the service;
    determining a service identifier from the data packets;
    generating the service request on the basis of the determined service identifier, and
    transmitting the generated service request.